Re-issue
Division A. Sheet X.

4269

E. G. Otis Impt. in Hoisting Apparatus.

Assigned to
Otis Brothers & Co.

REISSUED FEB 21 1871

Witnesses:
Fred Haynes
R. R. Rabiny

Otis Bros & Co
Chas. R. Otis Pres.
John L. Hubbard Secy

THE NORRIS PETERS CO., WASHINGTON, D. C.

Re-issue.
Division A. Sheet II.

E. G. Otis Impt in Hoisting Apparatus.

Assigned to
Otis Brothers & Co.

Witnesses:
Thos Haynes
R. R. Rabeau

A
Otis Bros & Co
Chas R. Otis Pres
John S. Hinchman Atty

THE NORRIS PETERS CO., WASHINGTON, D. C.

UNITED STATES PATENT OFFICE.

OTIS BROTHERS & COMPANY, OF YONKERS, N. Y., ASSIGNEES OF E. G. OTIS, DECEASED.

IMPROVEMENT IN HOISTING APPARATUS.

Specification forming part of Letters Patent No. 124, dated January 15, 1861; Reissue No. 4,269, dated February 21, 1871.

DIVISION A.

*To all whom it may concern:*

Be it known that E. G. OTIS, deceased, of Yonkers, in the county of Westchester and State of New York, invented a new and useful Improvement in Hoisting Apparatus, for which he obtained Letters Patent No. 124, dated January 15, 1861, of which OTIS BROTHERS & Co., of Yonkers, aforesaid, a joint-stock company incorporated under the laws of the State of New York are now the owners; and we, CHARLES R. OTIS, president, and JOHN L. HUBBARD, secretary of the said company, do hereby declare that the following is a full, clear, and exact description of the same, reference being had to the annexed drawings, making a part of this specification, in which—

Figure 1:
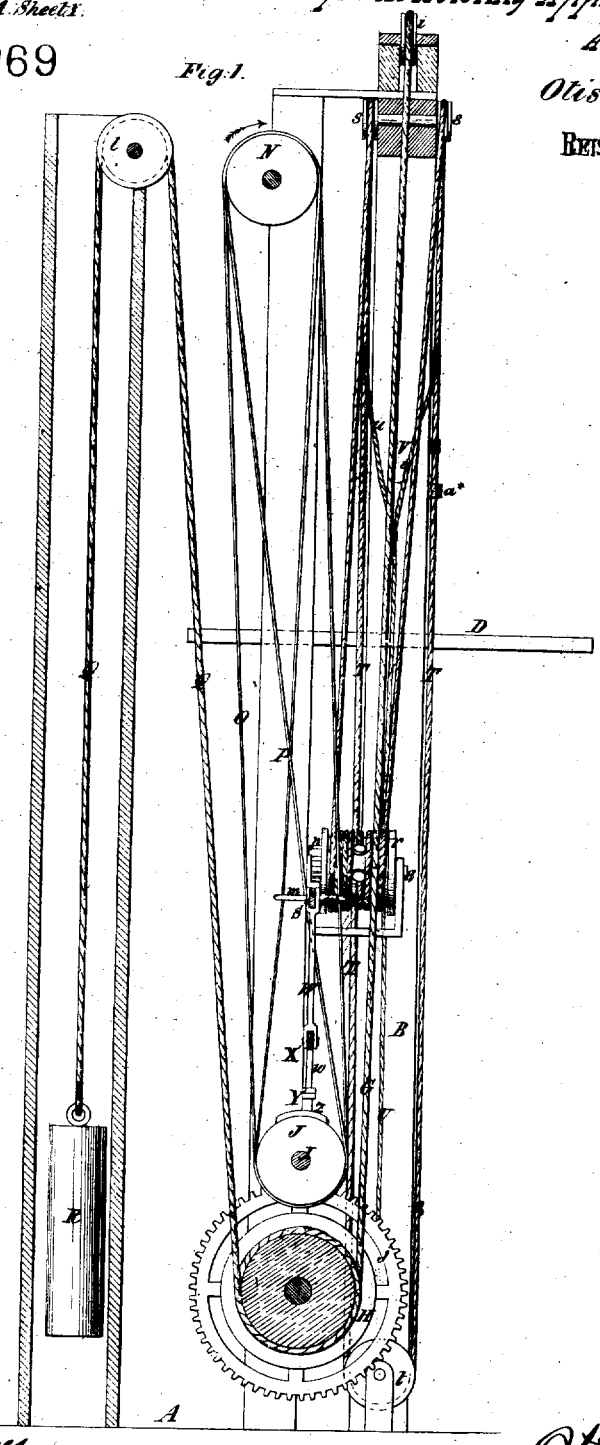
Figure 3:
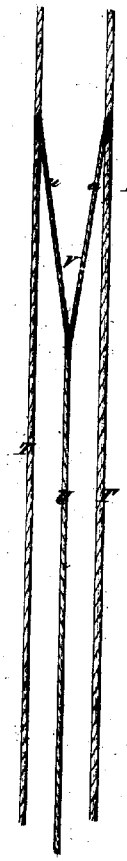
Figure 2:
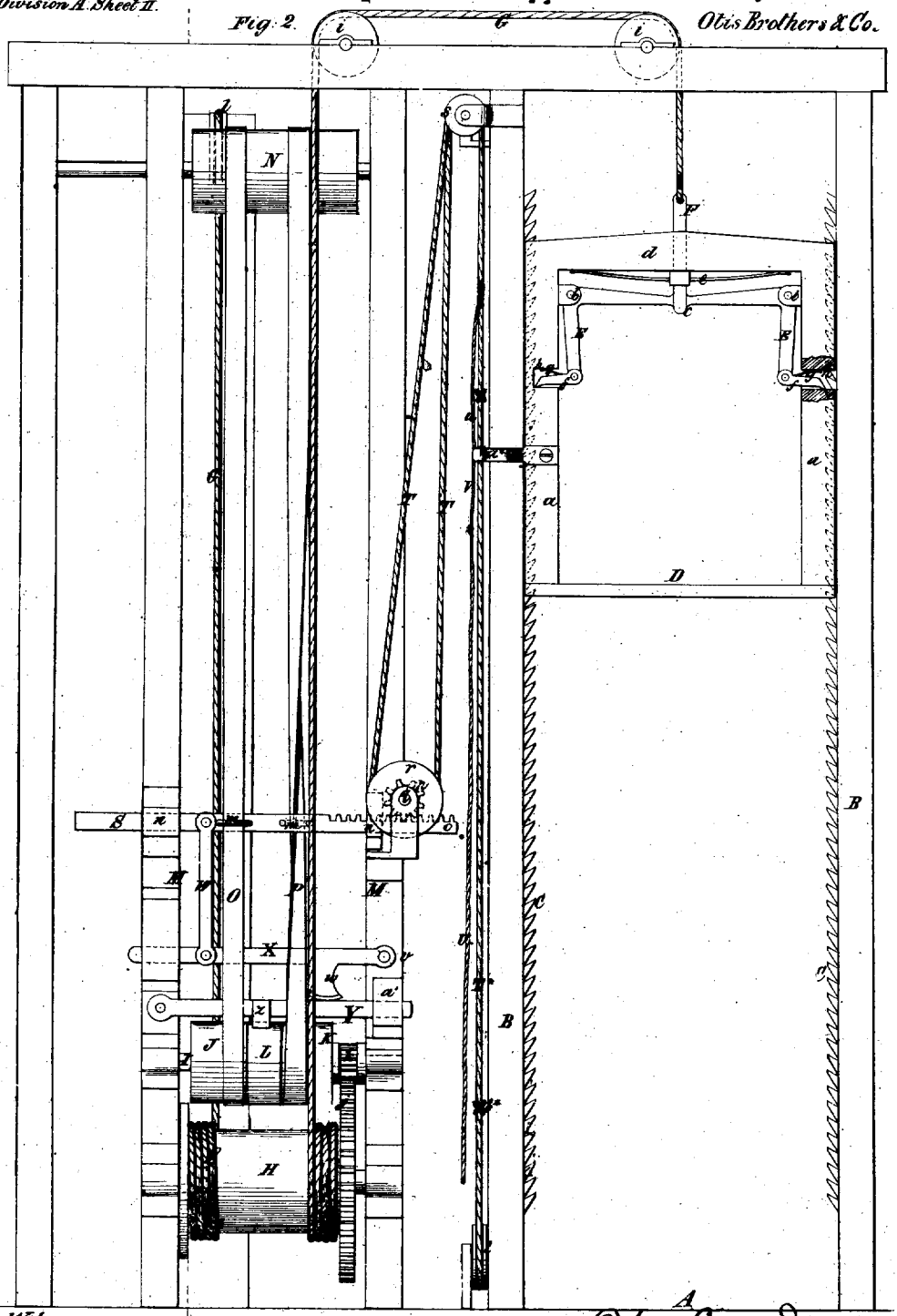

Figure 1 is a vertical section of an apparatus containing the improvement taken in the line *x x* of Fig. 2, which is a front view. Fig. 3 is a detached side view of the stop mechanism.

Similar letters of reference indicate corresponding parts in the several figures.

One object of this invention is to obtain a hoisting apparatus which may have its weight or load stopped at any desired point, and a brake automatically and simultaneously applied with the stoppage of the load or weight. Another object is to effect, in a certain and positive manner, the sustaining of the load or weight in case of the breaking of the lifting-rope.

The invention consists in a novel construction of the stop-pawls attached to the hoisting platform or cab, and the teeth of the racks in which they work, whereby their operation is rendered more certain and effective. It also consists in certain novel means, whereby the act of shifting the belts to stop or reverse the motion of the hoisting apparatus is made to apply to the brake.

To enable those skilled in the art to fully understand and construct the invention, we will proceed to describe it with reference to the drawings.

A represents a base, to which two uprights, B B, are secured. Said uprights have each a rack, C, at its inner side. These racks C have teeth of hook form, or the teeth may be described as having an inclination upward, as shown clearly in Fig. 2.

Between the uprights B B the hoisting-platform D is placed, said platform being secured to two uprights, *a a*, which are grooved vertically to receive the racks C C.

To each upright *a* a bent lever, E, is attached by a fulcrum-pin, *b*, and the inner ends of the levers E E overlap each other, and are fitted in an eye, *c*, at the lower end of a rod, F, which passes loosely through a rail or bar, *d*, that connects the upper ends of the uprights *a a*.

To the lower end of the rod F a spring, *e*, is attached, said spring having a tendency to keep the pawls *f*, which are attached to the lower ends of the levers E E, in gear with the racks C C. Th s will be fully understood by referring to Fig. 2, in which it will be seen that the pawls *f* are connected to the ends of the levers E by pivots, and have springs *g* attached, which springs have a tendency to keep the pawls pressed down into or between the teeth of the racks C C. The pawls, it will be seen by reference to Fig. 2, fit or work in mortises *h* in the uprights *a a*, and their points are hooked downward to match with the teeth of the racks C C.

To the upright end of the bar F there is a rope, G, attached. This rope G passes over pulleys *i i*, and, extending down, is attached to the hoisting-drum H, which is connected by gearing *j k* with a shaft, I, having two loose or idle pulleys, J K, upon it and a fast or working pulley, L, between them.

The hoisting-drum H and shaft I have their bearings attached to suitable uprights M M, and between these uprights there is placed a drum, N, around which and the idle-pulleys J K belts O P pass, one of which, O, is an open, and P a crossed, belt.

To the drum H a rope, Q, is attached securely. This rope winds on drum H, as shown in Fig. 1, in a contrary direction to the rope G, which is connected with the platform D. The said rope Q passes upward over a pulley,

*l*, and has a weight, R, attached to it, said weight serving as a counterpoise for the platform D.

The belts O P pass through eyes *m*, attached to a slide, S, which forms a belt-shipper. This slide is fitted in suitable guides *n n*, as shown in Fig. 2, and has a rack, *o*, at one end, to which a pinion, *p*, gears. This pinion *p* is on a shaft, *q*, which has a drum, *r*, placed on it, around which a rope, T, passes, said rope having both of its ends secured to the drum *r*, and being wound around it so that it passes on and off on opposite sides. This rope T also passes over pulleys *s s* and down around a pulley, *t*, near the base A. To the portion of the said rope T between the pulleys *s s* and *t*, a rope, U, is attached, as shown in Figs. 1 and 3, by a branched end, V, each part *u* of which is attached to a side of the rope T, as shown clearly in Fig. 3.

To the slide or belt-shipper S there is attached an arm, W, the lower end of which is attached by a pivot to a bar, X. This bar X is attached by a pivot, *v*, to one of the uprights M, and is provided with a pendent projection, *w*, which bears on a bar, Y, one end of which is attached by a pivot to one of the uprights M, and the opposite end fitted in a guide, *a'*, on one of the uprights.

To the bar Y, at about its center, there is attached a brake-shoe, Z, which, when the bar Y is pressed downward, bears upon the working-pulley L. The operation of this brake is as follows:

When the drum N rotates in the direction of the arrow shown in Fig. 1, and the belt P is on the working-pulley L, the rope G will be wound on the drum H and the platform D elevated; and in order to lower the platform the cross-belt P must be moved onto the working-pulley L and the open belt O moved onto the idle-pulley J. The shifting of these belts is effected by actuating the rope T by hand. The movement of this rope turns the drum *r*, so that the pinion *p* will, in consequence of gearing into the rack *o*, move the slide S.

The rope U forms the stop, and, when pulled down, both parts *u u* of the branched end V of the rope U have their upper ends, *u u*, brought into the same horizontal plane, as shown in Figs. 1 and 2, and the slide S will be so actuated that the open belt O will be on the idle-pulley J, and the cross-belt P on the idle-pulley K, the brake-shoe Z being at the same time pressed down on the working-pulley L and acting as a brake.

The branched end V of the rope U, it will be seen, actuates the rope T when the machine is in operation, but will have no effect on said rope when the brake is applied, as the upper ends of both parts *u u* of the end V will be in a horizontal line with each other.

In order to raise the platform D the rope T is moved by hand so as to throw the open belt O on the working-pulley L, the shoe Z being simultaneously raised; and in order to reverse the movement of the platform D and allow it to descend, the rope T is moved so as to shift the cross-belt P on the working-pulley L.

To one of the uprights *a* of the platform there is attached an arm, *a**, which has at its outer end an eye, through which the rope T passes, and said rope has upon it a knot or projection, *b**, against which, when the platform reaches its lowest point of descent, the arm *a** acts in such manner as to move the said rope in a direction to throw the belt P off the working-pulley L, by which movement also the brake Z is simultaneously applied.

In case the rope G should break in hoisting the loaded platform D, the pawls *f f*, in consequence of being released from the pull of said rope, will immediately be thrown in connection with the racks C C by the springs *e g g*, and, in consequence of said pawls and the teeth of the racks being of hook form, the pawls *f f*, under the weight of the load on the platform, will have a tendency to draw the uprights B B toward each other instead of forcing them apart, and the pawls lock themselves with the racks, so that casual disengagement is impossible.

Having thus described the invention, what we claim as new, and desire to secure by Letters Patent, is—

1. The pawls *f f* and the teeth of the racks C C, constructed of hook form, essentially as shown and described, for the purpose set forth.

2. The arrangement of the ropes T, U, and V, combined and operating substantially as and for the purpose set forth.

3. The arrangement of the slide or belt-shipper S, in connection with the shoe or brake Z and rope T, substantially as shown, to admit of the simultaneous application of the brake and the shifting of the belts O P on the idle-pulleys J K, as set forth.

CHAS. R. OTIS,
*President.*
JOHN L. HUBBARD,
*Secretary.*

Witnesses:
FRED. HAYNES,
R. E. RABEAU.